No. 722,827. PATENTED MAR. 17, 1903.
W. H. FENNER.
FURNACE.
APPLICATION FILED NOV. 11, 1901.
NO MODEL. 8 SHEETS—SHEET 1.
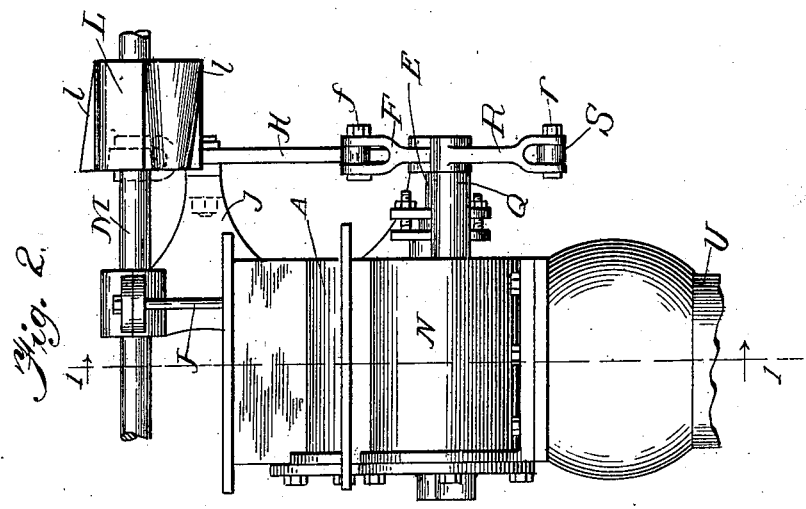
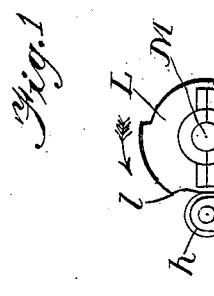
Witnesses:
J. B. Weir
Ira D. Perry
Inventor:
William H. Fenner
By Raymond & Barnett
Attys No. 722,827. PATENTED MAR. 17, 1903.
W. H. FENNER.
FURNACE.
APPLICATION FILED NOV. 11, 1901.
NO MODEL. 8 SHEETS—SHEET 2.
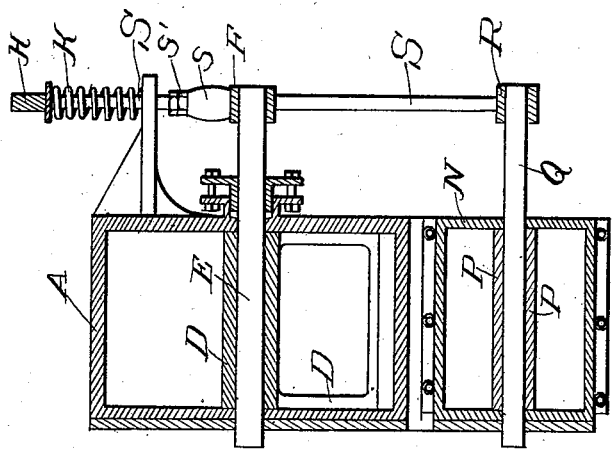
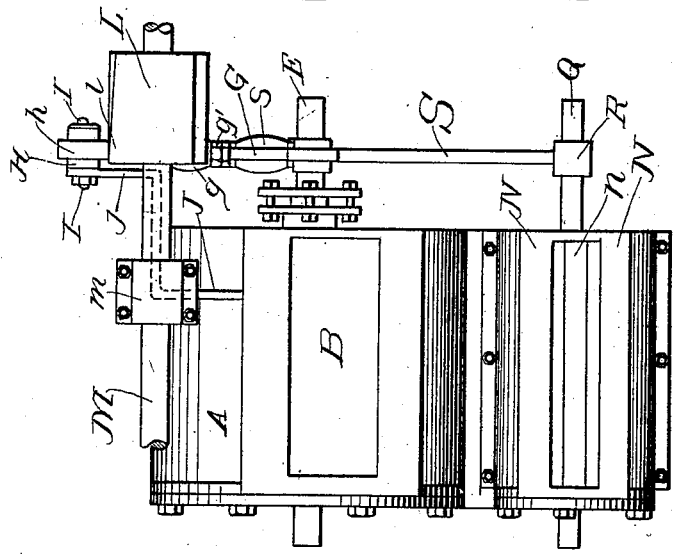

No. 722,827. PATENTED MAR. 17, 1903.
W. H. FENNER.
FURNACE.
APPLICATION FILED NOV. 11, 1901.
NO MODEL. 8 SHEETS—SHEET 3.
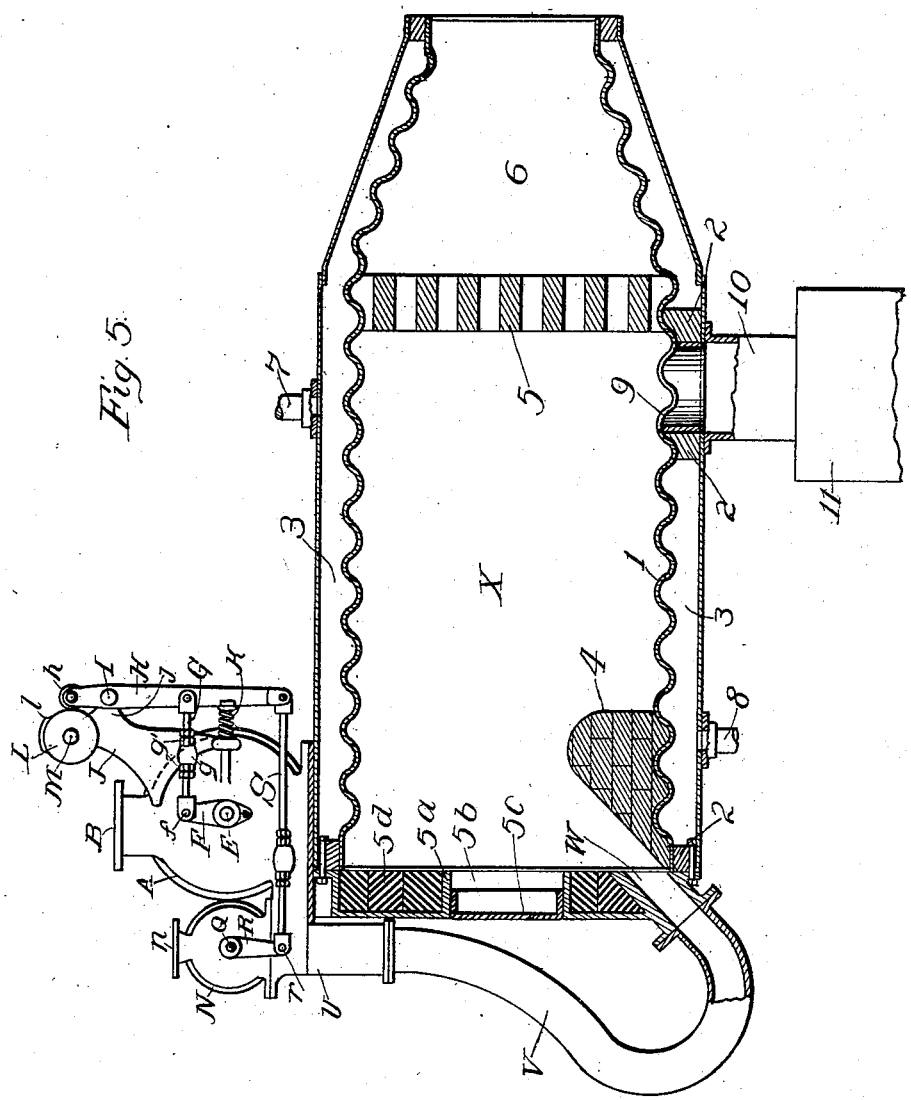

No. 722,827. PATENTED MAR. 17, 1903.
W. H. FENNER.
FURNACE.
APPLICATION FILED NOV. 11, 1901.
NO MODEL. 8 SHEETS—SHEET 4.

Witnesses.
J B Weir

Inventor
William H. Fenner
By Raymond H Barnett
Attys

No. 722,827. PATENTED MAR. 17, 1903.
W. H. FENNER.
FURNACE.
APPLICATION FILED NOV. 11, 1901.
NO MODEL. 8 SHEETS—SHEET 5.
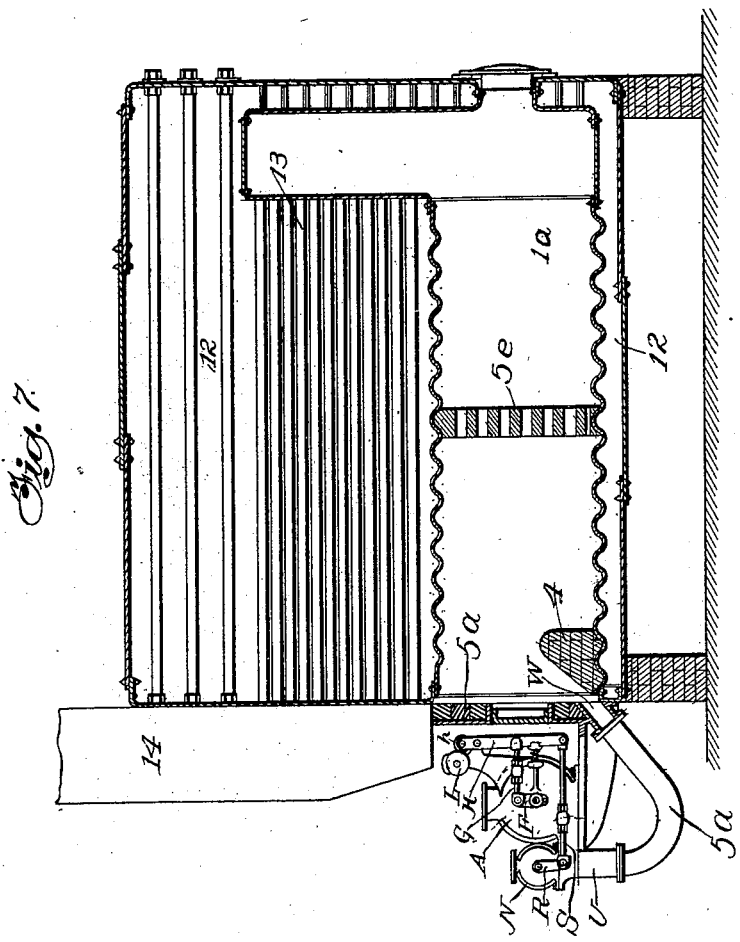
Witnesses:
J B Weir
Ead Perry
Inventor:
William H. Fenner
By Raymond & Barnett
Attys

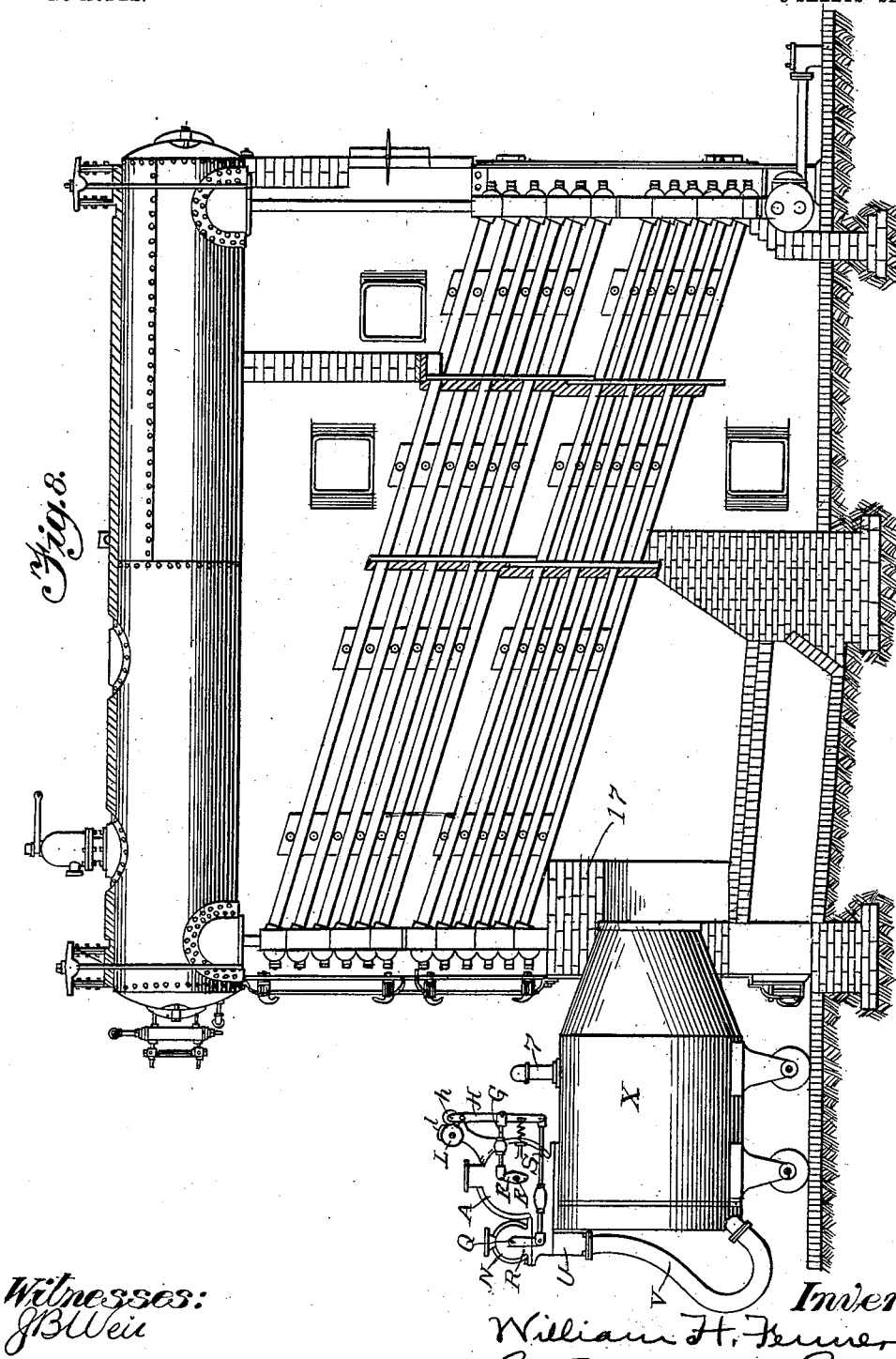

No. 722,827. PATENTED MAR. 17, 1903.
W. H. FENNER.
FURNACE.
APPLICATION FILED NOV. 11, 1901.
NO MODEL. 8 SHEETS—SHEET 7.
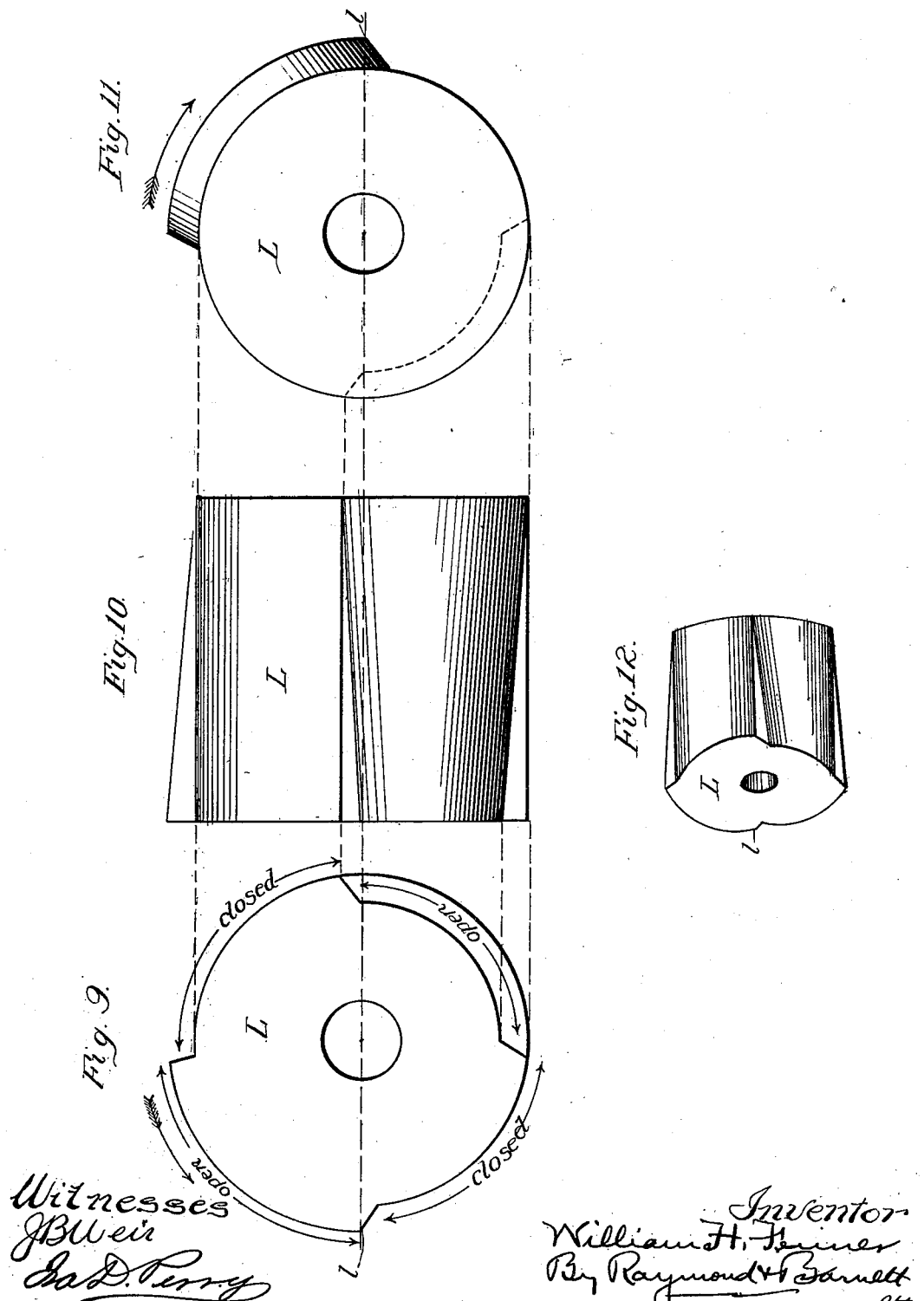

No. 722,827. PATENTED MAR. 17, 1903.
W. H. FENNER.
FURNACE.
APPLICATION FILED NOV. 11, 1901.
NO MODEL. 8 SHEETS—SHEET 8.

Witnesses: Inventor:
J. B. Weir William H. Fenner
Ira D. Perry By Raymond & Barnett
Attys

UNITED STATES PATENT OFFICE.

WILLIAM H. FENNER, OF CHICAGO, ILLINOIS.

FURNACE.

SPECIFICATION forming part of Letters Patent No. 722,827, dated March 17, 1903.

Application filed November 11, 1901. Serial No. 81,891. (No model.)

*To all whom it may concern:*

Be it known that I, WILLIAM H. FENNER, a citizen of the United States, residing at Chicago, in the county of Cook and State of Illinois, have invented certain new and useful Improvements in Furnaces, of which the following is a specification.

My invention relates more particularly to improvements in that class of devices which are exemplified in my application Serial No. 18,991.

Among the objects of my present invention is the provision of means for injecting fine fuel into a furnace fire-box in an upward direction, so that such fuel will remain in suspension for a sufficient period to allow all or most of it to be consumed while in suspension.

Another object of my invention is to provide simple, compact, and effective means for supplying duly proportioned and mixed charges of air and fuel to a fire-box.

Another object of my invention is to provide means in such a form that they may be attached to furnaces of different kinds to furnish fuel and air in mixed and proportioned quantities to the fire-boxes of such furnaces.

These and such other objects as may hereinafter appear are attained by the devices illustrated in the accompanying drawings, in which—

Figure 6:
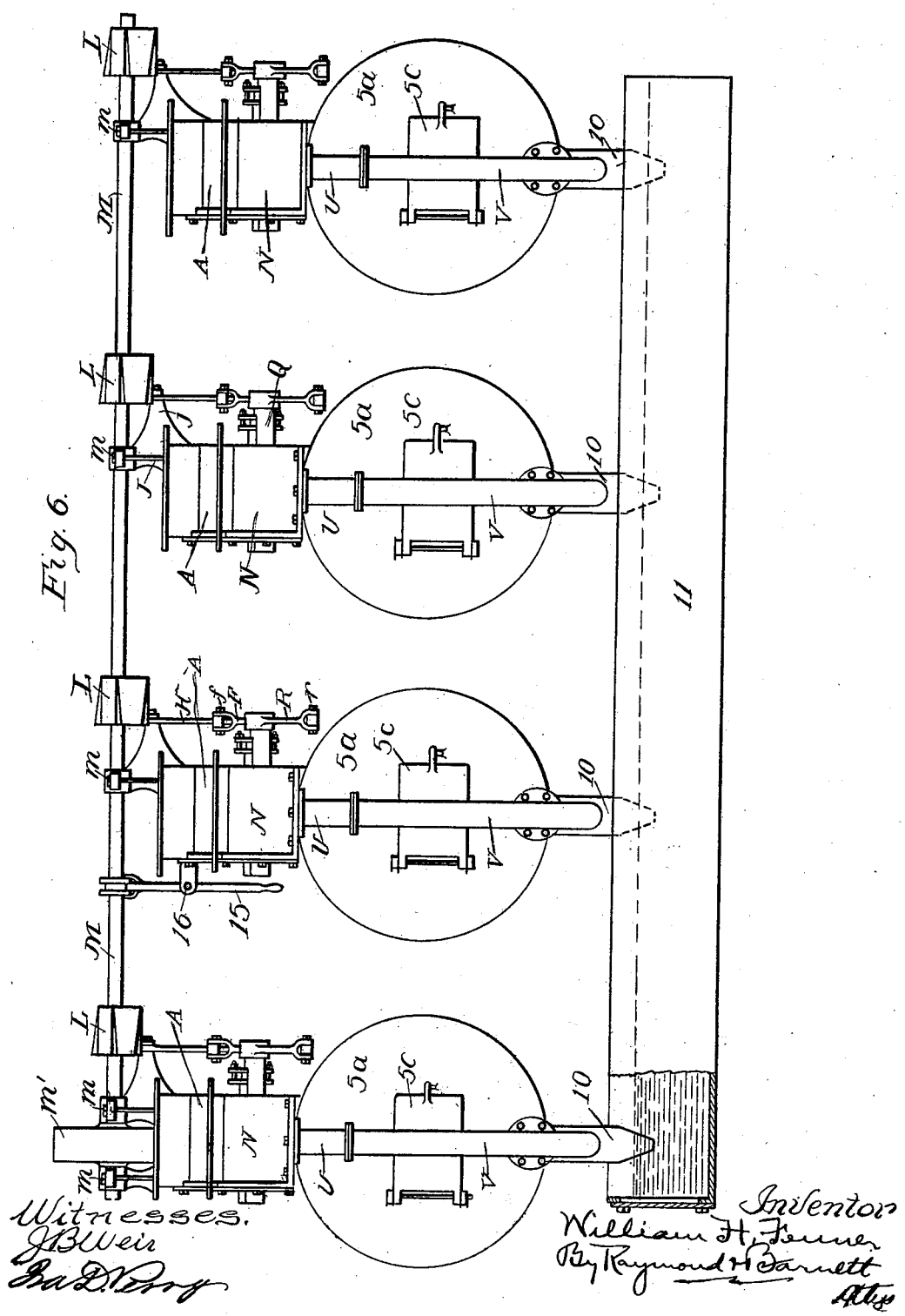
Figure 13:
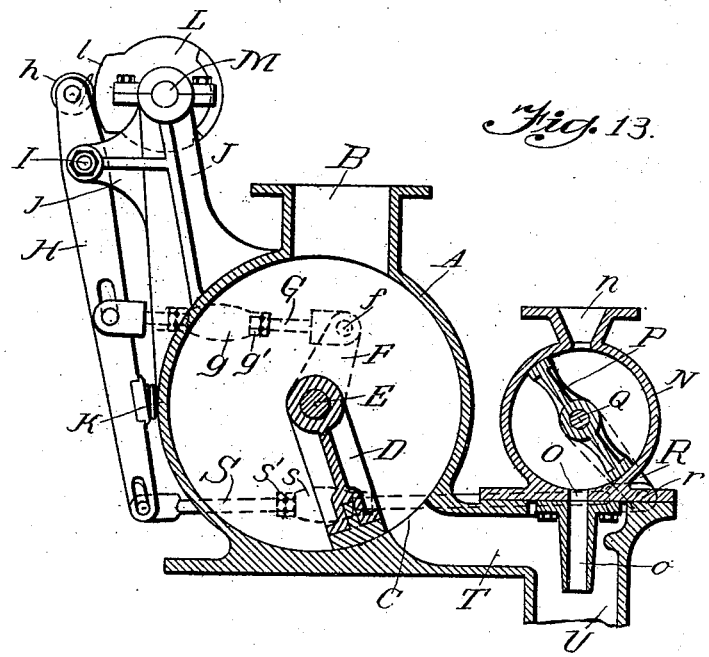
Figure 14:
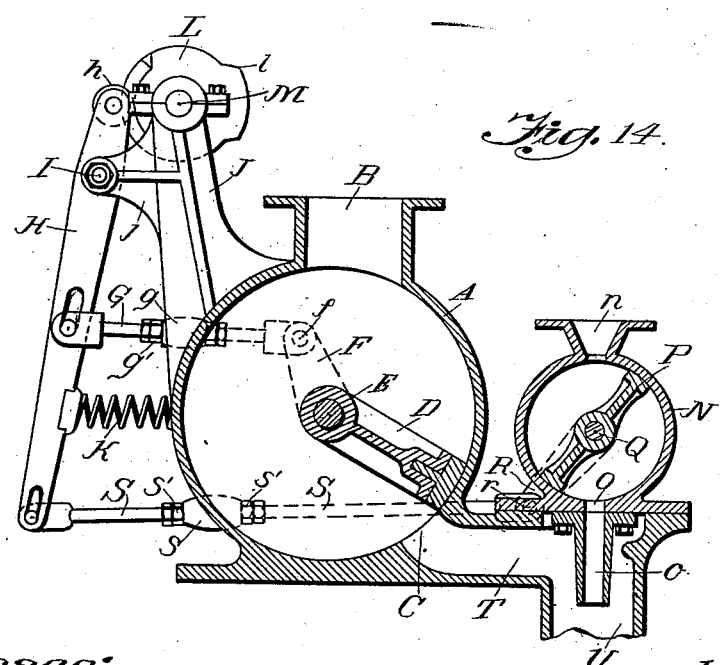

Figure 1 is a vertical section through my improved device on the line 1 1 of Fig. 2 looking in the direction indicated by the arrows. Fig. 2 is an end elevation thereof. Fig. 3 is a plan view of Fig. 1. Fig. 4 is a sectional plan view on the line 4 4 of Fig. 1. Fig. 5 is a view of one form of fire-box or combustion-chamber fitted with my improved device, which is shown in side elevation, the fire-box or combustion-chamber being shown in longitudinal section. Fig. 6 is an end elevation of a battery of four combustion-chambers fitted with my improvements as shown in Fig. 5. Fig. 7 shows a longitudinal sectional view of an internally-fired or Scotch boiler fitted with my improvements. Fig. 8 shows my device fitted to a portable combustion-chamber, the flameway of which is connected with the feed-opening of the fire-box of a water-tube boiler, a longitudial sectional view of the boiler being shown. Figs. 9, 10, and 11 are an end elevation, a side elevation, and an opposite end elevation, of my cam, the relations of the cam-faces to each of the figures being shown by dotted connecting lines. Fig. 12 is a perspective view of my cam. Fig. 13 is a similar view to Fig. 1, except that it shows the valves and valve-operating parts at the extreme end of their travel in one direction, while Fig. 14 shows the parts at the extreme end of travel in the opposite direction.

Like characters of reference indicate the same parts in the several figures of the drawings.

Referring by letter to the accompanying drawings, A is an air-tight cylinder or casing provided with an air-inlet port B and with a valve-controlled air-outlet port C, the opening to which is controlled by a valve D, which is mounted upon a shaft E, which extends axially through the cylinder A and passing through a stuffing-box is rigidly connected with a vibrating crank F on the outside of the cylinder, the outer end of which crank is pivotally connected, by means of an adjustable crank-pin $f$, with an arm or rod G, the opposite end of which arm is pivotally and adjustably attached to a lever H. The lever H is pivotally fulcrumed at I to a lug $j$ on an arm or casting J, which is formed upon or attached to the exterior of the cylinder A.

L is a cam which is rigidly mounted upon a shaft M, which shaft is journaled on the casting J and is power-driven in any suitable manner. In my preferred construction, as shown in Fig. 6, the shaft M is laterally movable within its bearings $m$ and is rotated by a pulley $m'$, which is confined between two of the bearings $m$ and is feathered to the shaft M. The upper end of the lever H is provided with an antifriction-roller $h$, which is arranged to engage the periphery of the cam L and is normally held in yielding contact therewith by means of a spring K, which is compressed between the long arm of the lever H and a stationary portion of the device.

N is a second casing or cylinder, which is provided with an inlet port or hopper $n$ and with an outlet-port O, which leads to an outlet-nozzle $o$. This nozzle $o$ is bolted to the under side of the casing N. Disposed within the casing N is a vibrating double-acting valve P, which is rigidly attached to a shaft Q. The upper end of the valve P controls the opening and closing of the inlet-port $n$, and the lower end thereof in like manner controls the outlet-port O. The shaft Q extends axially through the casing or cylinder N, and one end thereof projecting through an end of said casing is rigidly attached to a crank R, which is mounted thereon, said crank being pivotally attached, by means of an adjustable crank-pin $r$, to a rod S, the opposite end of which rod is pivotally and adjustably attached to the lower end of the long arm of the lever H.

The rods or arms G S are made adjustable by being formed in two sections, which are connected by internally-screw-threaded sleeves $g$ $s$, which engage the opposite screw-threaded ends of said arms and which may be locked by suitable jam-nuts $g'$ $s'$.

T is a passage which leads from the outlet-port C of the cylinder A to a larger passage U, into which the nozzle $o$ projects. I prefer to have the extreme outer end of the nozzle $o$ project into the passage U beyond the junction of the passage T with the passage U. The casing N is attached to the device adjacent to the passage U by means of an air-tight joint. The passage U connects with a suitable feed-pipe V, (see Fig. 5,) which leads to upwardly-projecting feed-openings or twyer W in the fire-box or combustion-chamber.

The operation of my device is as follows: Normally when my device is properly assembled and adjusted the parts stand in the positions shown in Figs. 1 and 2. The inlet-port B of the cylinder A, which I call the "air-cylinder," is connected with any suitable source of air or other fluid fuel element under pressure. In like manner the hopper or inlet-port $n$ of the coal-cylinder N is connected with a suitable source of supply of coal or other finely-divided fuel. The rotation of the power-driven shaft M to the left will now cause the cam L to rotate, and as one of the cam-faces $l$ is brought against the antifriction-roller $h$ the short arm of the lever H will be moved outwardly, causing a corresponding inward movement of the long arm of said lever, thereby shifting the valves D N to the position shown in Fig. 13. In this position the valve T will be shifted past the inlet-port $n$ and outlet-port O, thereby allowing the coal or other fine fuel to the left of said valve to pass through the port O, the nozzle $o$, and into the passage U, and at the same time allowing a fresh supply or charge of coal to flow into the coal-cylinder N at the right side of the valve P, as shown in Fig. 1. At the same time the air-valve D will uncover the outlet-port C, thereby allowing air or other fluid-fuel element under pressure to rush through the port C and passage T into the passage U, whence it will carry the charge of coal through the pipe V and twyer W into the combustion-chamber, the rush of air under pressure injecting the fuel upwardly in a finely-diffused cloud into the combustion-chamber. As the movement of the valve D and so the size of the opening which shall be uncovered thereby and also the length of time which the valve D shall remain open for each charge may be adjusted and regulated by means of the adjusting-arm G, the lever H, and the adjustable features of the cam L, which will be more fully explained, the exact amount of air to be fed with each charge of coal may be accurately measured and proportioned. As the cam L continues to rotate the cam-faces $l$ will pass from under the antifriction-roller $h$, thereby allowing the inward movement of the short arm of the lever H and a corresponding outward movement of the long arm thereof. This movement is brought about by the expression of the spring K. As the parts so move the valve D will return and close the port C, the valve P will close the ports $n$ and O, and the continued further movement of the parts will carry the valve P past the ports $n$ and O, so as to allow the discharge of another charge of coal from the coal-cylinder N, and the valve D will pass beyond the outlet-port C and allow the discharge therethrough of another charge of air under pressure, and so on so long as the power-shaft M continues to rotate, thereby resulting in the continuous discharge into the combustion-chamber of successive blasts of air duly measured and proportioned charges of fine fuel, which charges of air and fuel are burned or consumed in suspension as fast as they are discharged into the combustion-chamber. By providing the cam with abrupt changes between its lever-operating faces I am enabled to provide for the quick opening and closing of the valves, so that in my preferred construction the valves will move in a succession of opening and closing steps rather than in a continuous sweep backward and forward.

The cam L is preferably rigidly attached to the shaft M, and the cam-faces $l$ taper longitudinally and radially of the cam, as is more fully shown in Figs. 9, 10, and 11. By this arrangement I am enabled to control the feed by shifting the shaft M so that the cam will give a longer or shorter throw to the arms of the lever H, as may be desired. So, also, by changing the positions of the pins connecting the rods S and G with the lever H and with their respective cranks I am enabled to alter the throw of the cranks F R and to correspondingly change the movement of the valves D P.

By using the devices described in connection with a closed combustion-chamber the process of combustion will be that described and claimed in my copending application, Serial No. 70,347.

By means of the devices shown in the drawings I am also enabled to produce within the combustion-chamber a succession of interrupted blasts and explosions, whereby the formation of any continuous or regular currents within the combustion-chamber is prevented, the fuel is held in suspension until thoroughly consumed, and an intimate admixture of the fuel elements is so promoted as to bring about the most effective combination of said elements not only for the production of a most thorough combustion of the fuel, but also for its combustion in such a manner that the chemical combination thereby produced within the combustion-chamber and the ultimate combustion of the gases so formed shall produce a very high degree of heat efficiency.

In Fig. 5 I have shown the previously-described device mounted upon and connected with a cylindrical combustion-chamber X. This combustion-chamber is of the type of an internally-fired boiler and consists of a corrugated metal cylinder 1, supported by blocks 2 within a water-jacket 3. Within the cylinder 1 and adjacent to the twyer W I provide a deflecting-wall 4, so disposed that as the charges of air and fuel are discharged into the chamber through the twyer W said wall insures that all of each blast or charge of fuel is continued in an upward direction, so that all of the fuel diffused through the air will be thrown upwardly within the cylinder and will be held in suspension until consumed and also prevents the direct discharge of any portion of said blast of air and fuel through and out of the combustion chamber or cylinder 1. This wall is preferably made of a refractory material, and under the influence of the ignition of the blasts of fuel discharged adjacent to it, producing a combustion which is in the nature of a blowpipe action, this wall will be brought to a white heat, so that after combustion is once fairly under way the presence of this superheated wall of refractory material also insures the immediate ignition of each blast of fuel as it is discharged into the combustion-chamber and against this wall. Across the farther end of the main portion of the cylinder 1 I preferably provide a checker-work wall 5 for still further retarding the discharge of the gases and products of combustion from the cylinder 1 through the cone-shaped flameway 6, whence the mass of gases in combustion will be discharged under the boiler. Of course the escape of the products of combustion may be still further retarded by the use of deflecting walls and arches in any well-known manner located within the cylinder 1.

7 and 8 are supply and discharge pipes, respectively, for supplying water to the water-jacket and for the discharge of the heated water. If desired, this water-jacket may be used to heat feed-water for the boiler.

At 9 I provide a discharge-opening for the removal of silica and like residue which may result from the combustion within the chamber or cylinder 1. In order to enable the constant discharge of this residue of non-combustible material without interfering with the action of my apparatus, I connect the discharge-opening 9 by means of a discharge-pipe 10 with a trough or receptacle 11. This trough is partially filled with water, within which the lower end of the discharge-pipe 10 projects, thereby providing a water seal.

As shown in Fig. 6, where a battery of my devices is used, a suitable trough 11 may provide the water seal for the discharge-pipes 10 of each of the combustion-chambers in the battery. From time to time such residue may be readily removed from said trough by means of a scraper or any other suitable instrument or by a current of water running therethrough.

I close the outer end of the combustion-chamber with a head $5^a$, which is bolted to the end of the combustion-chamber. This head is preferably of the form shown in Fig. 5 and is provided with a manhole $5^b$, which is closed by a suitable door $5^c$. The head $5^a$ is filled with fire-brick $5^d$.

While the bulk of the silicious residue formed within the combustion-chamber will be discharged through the opening 9, there may be some portion thereof which will gather in the bottom of the combustion-chamber. Such residue may be conveniently removed from time to time by means of a steam-jet, which may be introduced through the manhole $5^b$ or through a smaller opening which may be provided for that purpose, such steam-jet being used in connection with a suitable nozzle to clean the combustion-chamber in substantially the same manner as such jet is commonly used to clean boiler-flues.

In Fig. 7 I have shown my device fitted directly to the fire-box of an internally-fired boiler, in which case I prefer to remove the grate from the fire-box, to fit the fire-box with a metallic front or head $5^a$, to which my improved device is attached and upon which it may be mounted, and to provide the fire-box with the deflecting-wall 4 and the retarding-wall $5^e$. In this construction the fire-box $1^a$ of the boiler constitutes the combustion-chamber. The boiler 12 is the water-jacket, so that there is no waste of heat by radiation from the surface of the combustion-chamber, but the heat developed by the combustion within the fire-box or combustion-chamber $1^a$ serves to at once begin the formation of steam within the boiler, which process is further carried out as the mass of flame passes out of the fire-box upward, thence through the fire-tubes 13, and finally out of the uptake 14 in the manner usual with this class of boilers; but by fitting the fire-box with my device instead of limiting the fire to the comparatively small grate-surface with which such fire-boxes are fitted I am enabled to fill the entire fire-box with a mass of live flame, thereby vastly increasing the amount of heat evolved within the fire-box. Further, by the use of my apparatus I dispense with the grate and with the ash-pit therebelow. As is well understood, with this class of boilers when fitted with a grate the air-space and ashes below the grate serve to so insulate the portion of the fire-box lying below the grate that there is but little or no radiation from that portion of the fire-box, whereas with my device there is no such insulation. The entire body of the fire-box is filled with a mass of live flame, resulting from the bringing of the gases within the chamber to a high state of combustion, and the entire surface of the fire-box or combustion-chamber is made available and is brought to the highest state of efficiency for steam-generating purposes, as there is a substantially uniform radiation from the entire surface of the fire-box.

In Fig. 8 I have shown a separate combustion-chamber of the type shown in Fig. 5 mounted upon trucks, so as to be portable, and having its conical flameway removably fitted to the feed-opening of a water-tube-boiler fire-box. When so used, I prefer providing the fire-box of the boiler with an arch 17 for protecting the fittings at the front of the boiler from the intense heat of the live flame discharged into the fire-box.

In Fig. 6 I have shown as a convenient means for shifting the shaft M a hand-lever 15, pivotally mounted at 16 upon the casing of one of my devices. Of course various other means for shifting this shaft either manually or automatically will readily occur to the skilled mechanic as the convenience or exigencies of each plant may require.

While I have shown my invention in its preferred form, I am aware that various changes may be made as a matter of convenience or shop expediency; but such variations and changes do not constitute a departure from the spirit of my invention and are contemplated thereby.

Having thus described my invention, what I claim, and desire to secure by Letters Patent, is—

1. In an apparatus of the class described, the combination with a fuel-chamber provided with a feed and with a discharge opening, of a vibrating valve axially mounted within said chamber so as to control both the feed and discharge openings, and means for vibrating said valve about the axis of said fuel-chamber, substantially as described.

2. In a device of the class described, the combination with a fuel-chamber provided with feed and discharge openings, of a vibrating valve mounted within said fuel-chamber to control said feed and said discharge openings and a web dividing said chamber into compartments and arranged to vibrate in unison with said valve, and means for vibrating said valve, substantially as described.

3. In a device of the class described, the combination with a fuel-chamber provided with feed and discharge openings, of a vibrating valve arranged within said chamber to control said feed and discharge openings, said valve also constituting a partition for dividing said chamber into two non-communicating compartments, and means for vibrating said valve to alternately open and close said feed and discharge ports, substantially as described.

4. In a device of the class described, the combination with a main valve-operating lever, of a laterally-movable cam arranged to actuate said lever, said cam being provided with radially-tapering and longitudinally-converging faces arranged to successively engage said lever, and means for shifting said cam, substantially as described.

5. In a device for burning fine fuel in suspension, the combination with a combustion-chamber, of means for supplying an upwardly-directed blast of fuel in suspension, a discharge-opening arranged in the bottom of said chamber and rearwardly from the point of entrance of said blast, a water seal, and means for connecting said discharge-opening with said water seal, substantially as described.

6. In a device for burning fine fuel in suspension, the combination with a combustion-chamber of means for supplying upwardly-directed blasts of fine fuel in suspension to a zone of combustion therein, a discharge-opening arranged in the bottom of said combustion-chamber, within the path of said blasts and beyond the zone of initial combustion, a water seal arranged below said combustion-chamber and means for connecting said discharge-opening with said water seal, substantially as described.

7. The combination with a closed combustion-chamber, of means for supplying upwardly-directed blasts of fine fuel in suspension, to a zone of combustion therein, means for retarding the passage of a current through said chamber, a discharge-opening arranged in the bottom of said combustion-chamber and beyond said retarding means, a water seal, and means connecting said discharge-opening with said water seal, substantially as described.

8. The combination with a closed combustion-chamber, of a twyer opening thereto in an upward direction, means for supplying fuel in suspension to said fire-box through said twyer, an inclined wall of refractory material arranged within said fire-box and adjacent to said twyer, an opening arranged in said fire-box in the path of the blast therethrough, and beyond and below the zone of initial combustion, a water seal and means connecting said discharge-opening with said water seal, substantially as described.

WILLIAM H. FENNER.

Witnesses:
M. E. SHIELDS,
F. H. DRURY.